(12) United States Patent  
Lim et al.

(10) Patent No.: US 12,101,211 B2  
(45) Date of Patent: Sep. 24, 2024

(54) METHOD AND DEVICE FOR CLASSIFYING SENSING FRAMES IN WIRELESS LAN SYSTEM

(71) Applicant: LG ELECTRONICS INC., Seoul (KR)

(72) Inventors: Dongguk Lim, Seoul (KR); Jinsoo Choi, Seoul (KR); Insun Jang, Seoul (KR); Jeongki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 17/924,546

(22) PCT Filed: May 21, 2021

(86) PCT No.: PCT/KR2021/006340  
§ 371 (c)(1),  
(2) Date: Nov. 10, 2022

(87) PCT Pub. No.: WO2021/246690  
PCT Pub. Date: Dec. 9, 2021

(65) Prior Publication Data  
US 2023/0188395 A1  Jun. 15, 2023

(30) Foreign Application Priority Data  
Jun. 2, 2020  (KR) .................. 10-2020-0066569

(51) Int. Cl.  
*H04L 27/26* (2006.01)  
*H04L 5/00* (2006.01)  
*H04W 72/0446* (2023.01)

(52) U.S. Cl.  
CPC .......... *H04L 27/2602* (2013.01); *H04L 5/005* (2013.01); *H04W 72/0446* (2013.01)

(58) Field of Classification Search  
CPC . H04L 27/2602; H04L 5/005; H04W 72/0446  
See application file for complete search history.

(56) References Cited

U.S. PATENT DOCUMENTS

2018/0324695 A1  11/2018  Trainin et al.  
2019/0037549 A1   1/2019  Xu et al.  
(Continued)

FOREIGN PATENT DOCUMENTS

WO  2017023005 A1   2/2017  
WO  2019216571 A1  11/2019

OTHER PUBLICATIONS

Ghasempour, Yasaman et al., IEEE 802.11ay; Next-Generation 60 GHz Communication for 100 GB/s Wi-Fi, IEEE Communications Magazine (vol. 55, Issue 12, Dec. 2017), Oct. 27, 2017, see pp. 186-190, and figures 1 and 5a-5b.  
(Continued)

*Primary Examiner* — Sophia Vlahos  
(74) *Attorney, Agent, or Firm* — BRYAN CAVE LEIGHTON PAISNER LLP

(57) ABSTRACT

Proposed are a method and device for performing sensing in a wireless LAN system. Specifically, a transmission STA generates a frame. The transmission STA transmits the frame to a reception STA in a 60 GHz band. The frame includes an EDMGHeader-A field. A reserved bit of the EDMG-Header-A field includes a packet classification descriptor. The packet classification descriptor includes information indicating that the frame is a sensing frame used for sensing.

14 Claims, 14 Drawing Sheets

(56) References Cited

U.S. PATENT DOCUMENTS

2020/0359248 A1  11/2020  Sadeghi et al.
2021/0152674 A1   5/2021  Motozuka et al.
2023/0188395 A1   6/2023  Lim et al.

OTHER PUBLICATIONS

Kim, Jinmin et al., EDMG-Header-A contests, IEEE 802.11-16/1485-00-00ay, Nov. 7, 2016, see slides 2-11 and 16-17.
Eitan, Alecsander et al., EDMG Header-A Fields preview in L-Header, IEEE 802.11-16/1395-01-00, Nov. 10, 2016, see slides 2-5.
The 802 11 Working Group of the LAN/MAN Standards Committee of the IEEE Computer Society, "P802.11ay(TM)/D2.1 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced t," Oct. 2018, pp. 1-679, XP068137612.
Han et al. "Furthure Discussion for WLAN Radar," IEEE 802.11-19/0080r0, Jan. 2019, 12 pages.

FIG. 8

| L-STF | L-CEF | L-Header | EDMG-Header-A | EDMG-STF | EDMG-CEF |

FIG. 9

| L-STF | L-CEF | L-Header | EDMG-Header-A | EDMG-CEF |

FIG. 10

| L-STF | L-CEF | L-Header | EDMG-Header-A | EDMG-STF | EDMG-CEF | TRN |

FIG. 11

| L-STF | L-CEF | L-Header | EDMG-Header-A | EDMG-STF | TRN |

METHOD AND DEVICE FOR CLASSIFYING SENSING FRAMES IN WIRELESS LAN SYSTEM

This application is the National Stage filing under 35 U.S.C. 371 of International Application No. PCT/KR2021/006340 filed on May 21, 2021, which claims priority to Korean Patent Application Nos. 10-2020-0066569 filed on Jun. 2, 2020, the contents of which are all hereby incorporated by reference herein in their entirety.

TECHNICAL FIELD

The present specification relates to a technique for performing sensing in a wireless LAN system, and more particularly, to a method and an apparatus for classifying a sensing frame used for channel measurement in a 60 MHz band.

BACKGROUND

A wireless local area network (WLAN) has been improved in various ways. For example, IEEE 802.11bf wireless LAN sensing is the first standard that converges communications and radar technologies. Although the demand for unlicensed spectrum is rapidly increasing in everyday life and industry, there is a limit to the new spectrum supply. Therefore, the development of convergence technology between communication and radar is a very desirable direction in terms of increasing frequency utilization efficiency. Sensing technology that detects movement behind a wall using a wireless LAN signal or a radar technology that detects movement in a vehicle using a Frequency Modulated Continuous Wave (FMCW) signal in the 70 GHz band is being developed. It can be of great significance in that it can raise the sensing performance to one level by linking it. In particular, as the importance of privacy protection is increasingly emphasized in modern society, the development of wireless LAN sensing technology that is legally free from the issue of privacy infringement is more expected than CCTV.

Meanwhile, the overall radar market across automobiles, defense, industry, and life is expected to grow at a compound annual growth rate (CAGR) of about 5% by 2025, and in particular, in the case of living sensors, the CAGR is expected to grow rapidly to 70%. Wireless LAN sensing technology can be applied to a wide range of real-life applications such as motion detection, breathing monitoring, positioning/tracking, fall detection, in-vehicle infant detection, appearance/proximity recognition, personal identification, body motion recognition, and behavior recognition, thereby promoting the growth of related new businesses and It is expected to contribute to enhancing the competitiveness of the company.

SUMMARY

The present specification proposes a method and apparatus for classifying a sensing frame in a WLAN system.

An example of the present specification proposes a method of classifying a sensing frame.

This embodiment may be performed in a network environment in which a next-generation wireless LAN system (IEEE 802.11bf) is supported. The next-generation wireless LAN system is a wireless LAN system improved from 802.11ad and 802.11ay systems, and may satisfy backward compatibility with 802.11ad and 802.11ay systems.

This embodiment is performed in a transmitting STA, and the transmitting STA may correspond to a sensing initiator. The receiving STA of this embodiment may correspond to a sensing responder.

This embodiment proposes a method of setting a packet classification indicator for distinguishing a sensing frame used to sense a motion or gesture of an STA or an object using a wireless signal of a 60 GHz band from a normal frame.

A transmitting station (STA) generates a frame.

The transmitting STA transmits the frame to the receiving STA in a 60 GHz band.

The frame includes an EDMG-Header-A field. A packet classification indicator is included in a reserved bit of the EDMG-Header-A field. The packet classification indicator includes information indicating that the frame is a sensing frame used for sensing. That is, the receiving STA may confirm that the frame is the sensing frame based on the packet classification indicator. As a result, the receiving STA does not need to attempt to detect data for the frame, so that the decoding process can be efficiently performed.

Using the sensing frame proposed in this specification, it satisfies coexistence with the 802.11ay system existing in the 60 GHz band. There is an effect that the movement and change of a user or an object can be efficiently detected using the sensing frame in the 60 GHz band.

BRIEF DESCRIPTION OF THE DRAWINGS

FIG. 8 shows an example of a sensing frame format.

FIG. 9 shows another example of a sensing frame format.

FIG. 10 shows another example of a sensing frame format.

FIG. 11 shows another example of a sensing frame format.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features that are individually described in one drawing in this specification may be implemented individually or simultaneously.

The following examples of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may be applied to a newly proposed wireless LAN sensing standard or IEEE 802.11bf standard.

Hereinafter, technical features to which the present specification can be applied in order to describe the technical features of the present specification will be described.

Wireless LAN sensing technology is a kind of radar technology that can be implemented without standards, but it is judged that stronger performance can be obtained through standardization. The IEEE 802.11bf standard defines devices participating in WLAN sensing by function as shown in the table below. According to its function, it can be divided into a device that initiates wireless LAN sensing and a device that participates, and a device that transmits and receives a sensing PPDU (Physical Layer Protocol Data Unit).

TABLE 1

| Term | Function |
| --- | --- |
| Sensing Initiator | A device that initiates sensing |
| Sensing Responder | A device that participates in sensing |
| Sensing Transmitter | A device that transmits a sensing PPDU |
| Sensing Receiver | A device that receives a sensing PPDU |

Figure 1:
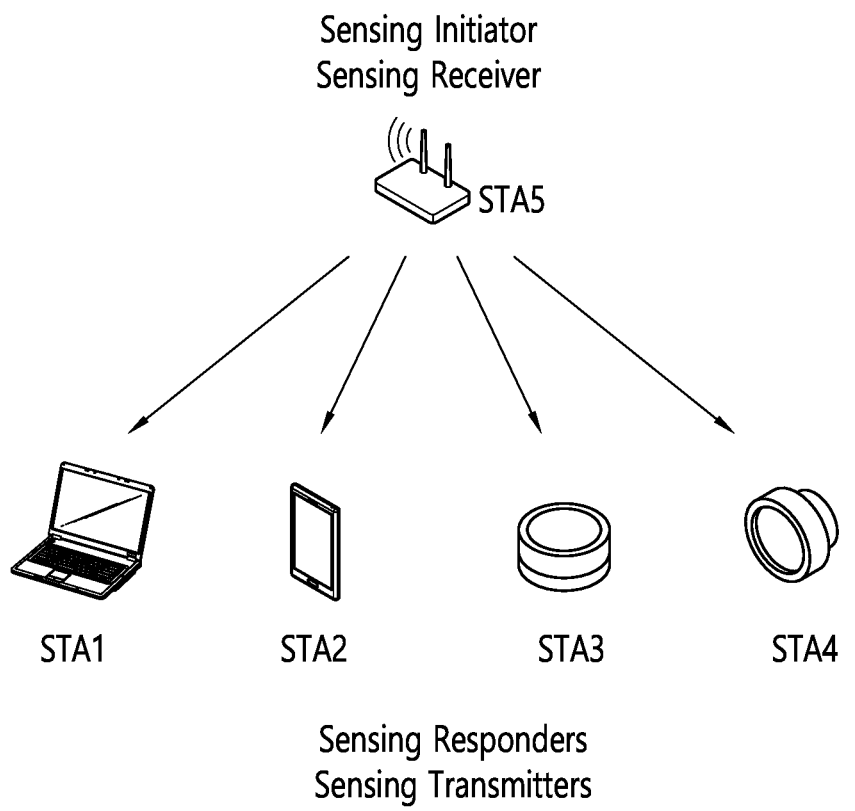
FIG. 1 shows an example of a wireless LAN sensing scenario using a multi-sensing transmitting device.

FIG. 1 shows an example of a wireless LAN sensing scenario using a multi-sensing transmitting device.

Figure 2:
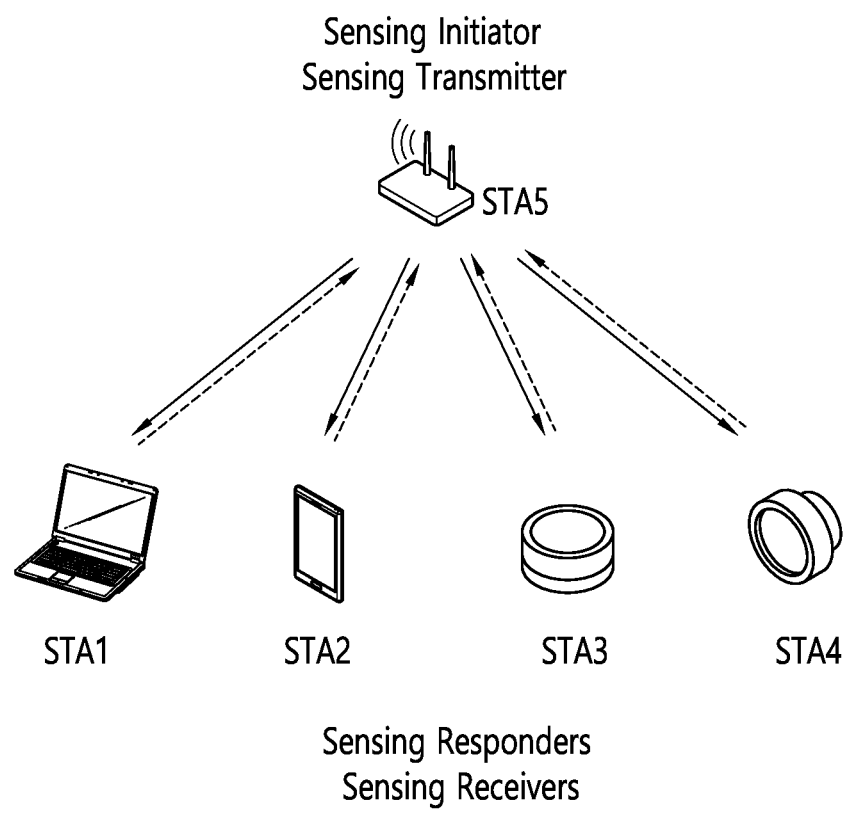
FIG. 2 shows an example of a wireless LAN sensing scenario using a multi-sensing receiving device.

FIG. 2 shows an example of a wireless LAN sensing scenario using a multi-sensing receiving device.

FIGS. 1 and 2 show sensing scenarios according to the function and arrangement of a wireless LAN sensing device. In an environment assuming one sensing start device and multiple sensing participating devices, FIG. 1 is a scenario using multiple sensing PPDU transmitting devices, and FIG. 2 is a scenario using multiple sensing PPDU receiving devices. Assuming that the sensing PPDU receiving device includes the sensing measurement signal processing device, in the case of FIG. 2, a procedure for transmitting (feedback) the sensing measurement result to the sensing initiate device (STA 5) is additionally required.

Figure 3:
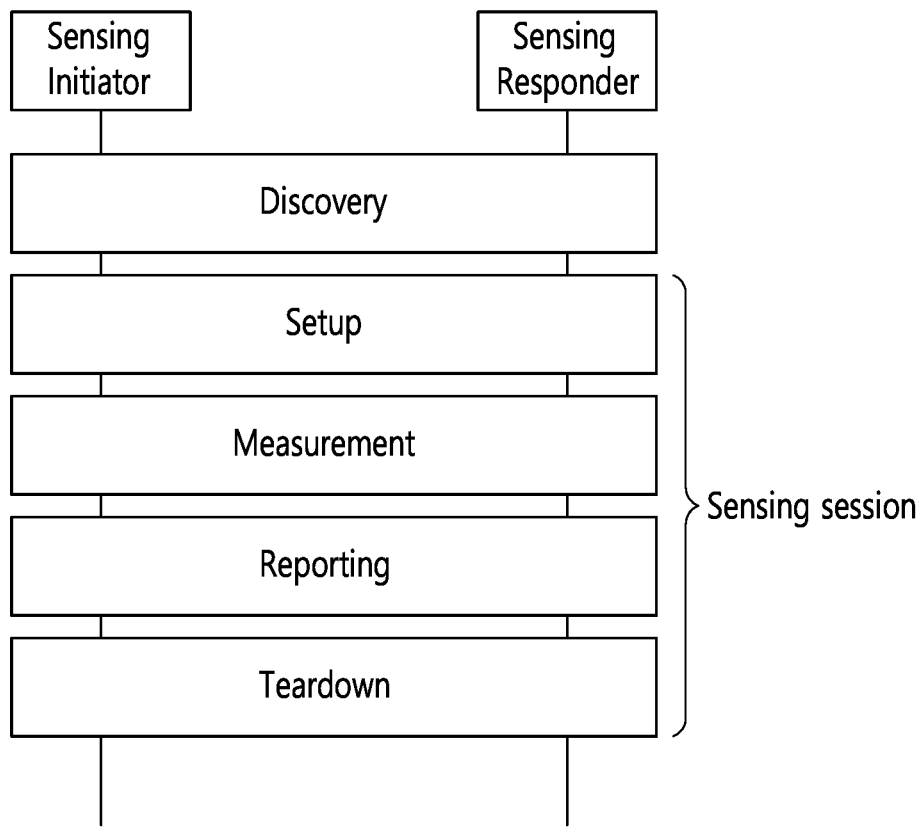
FIG. 3 shows an example of a wireless LAN sensing procedure.

FIG. 3 shows an example of a wireless LAN sensing procedure.

Looking at the procedure of wireless LAN sensing, discovery, negotiation, measurement exchange, and tear down are performed between the wireless LAN sensing initiate device and the participating device. Discovery is a process of identifying the sensing capabilities of WLAN devices, negotiation is a process of determining a sensing parameter between a sensing initiate device and a participating device, and measurement value exchange is a process of transmitting a sensing PPDU and transmitting a sensing measurement result, and connecting release is the process of terminating the sensing procedure.

Figure 4:
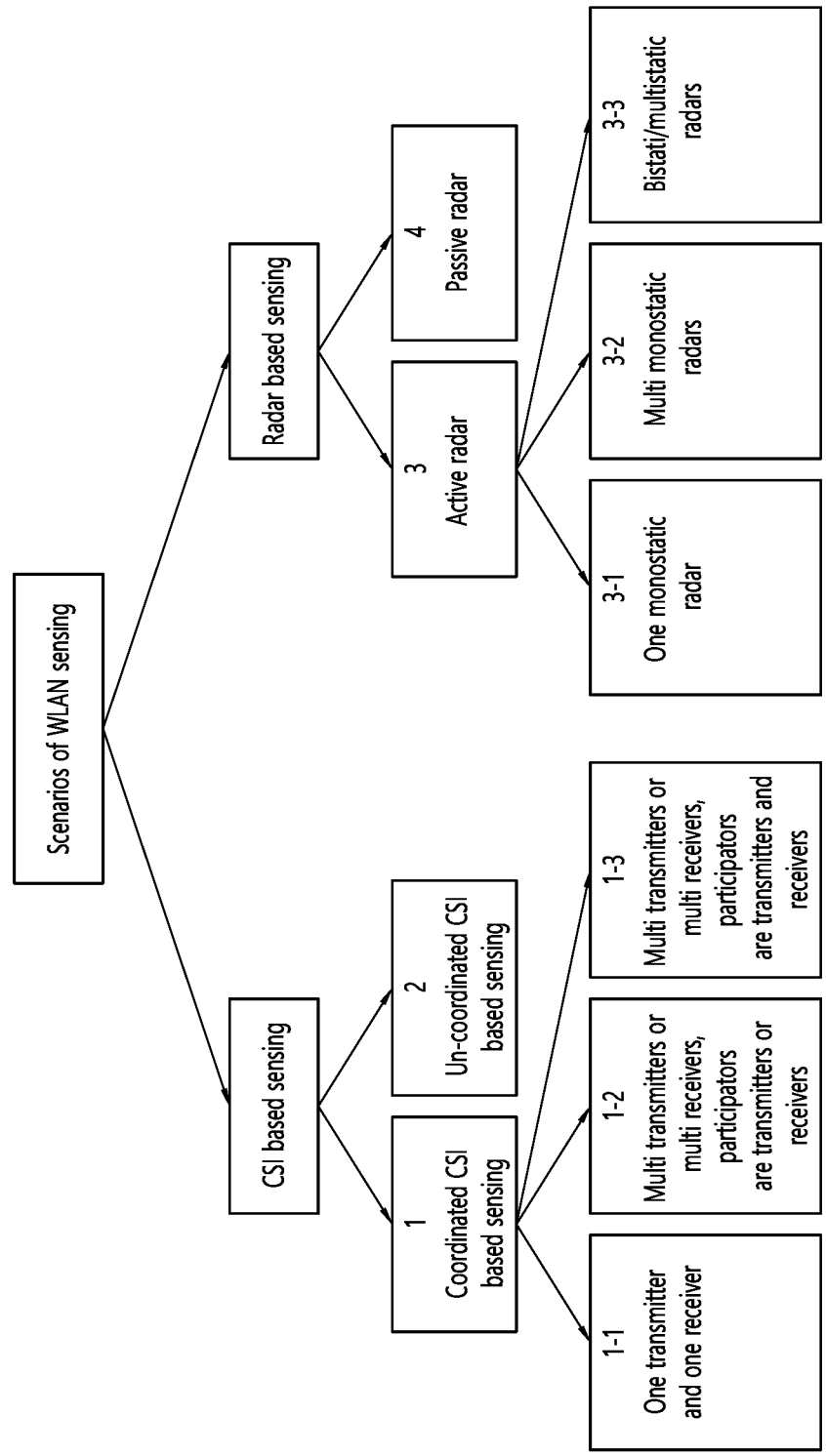
FIG. 4 is an example of classification of wireless LAN sensing.

FIG. 4 is an example of classification of wireless LAN sensing.

Wireless LAN sensing can be classified as "CSI-based sensing that uses channel state information of a signal that arrives at a receiver through a channel from a transmitter" and "Radar-based sensing that uses a signal received after a transmitted signal is reflected by an object". In addition, each sensing technology includes a method in which a sensing transmitter directly participates in the sensing process (coordinated CSI, active radar) and a method in which the sensing transmitter does not participate in the sensing process, that is, there is no dedicated transmitter participating in the sensing process (un-coordinated CSI, passive radar).

Figure 5:
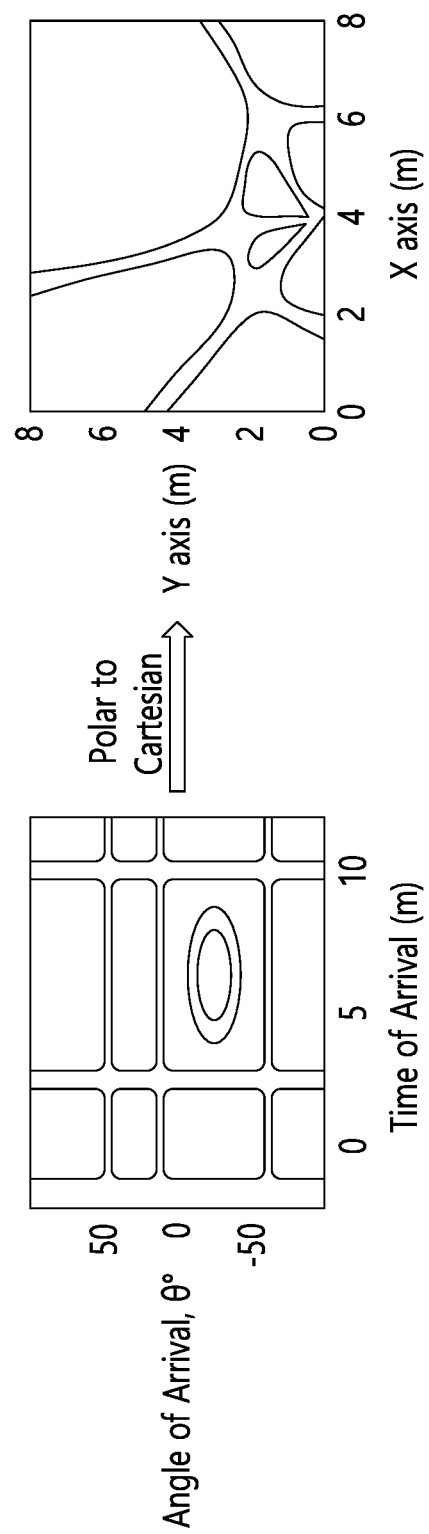
FIG. 5 shows indoor positioning using CSI-based WLAN sensing.

FIG. 5 shows indoor positioning using CSI-based WLAN sensing.

FIG. 5 shows that CSI-based wireless LAN sensing is used for indoor positioning. The sensing device may obtain indoor positioning information by obtaining an angle of arrival and a time of arrival by using the CSI and converting these into orthogonal coordinates.

Figure 6:
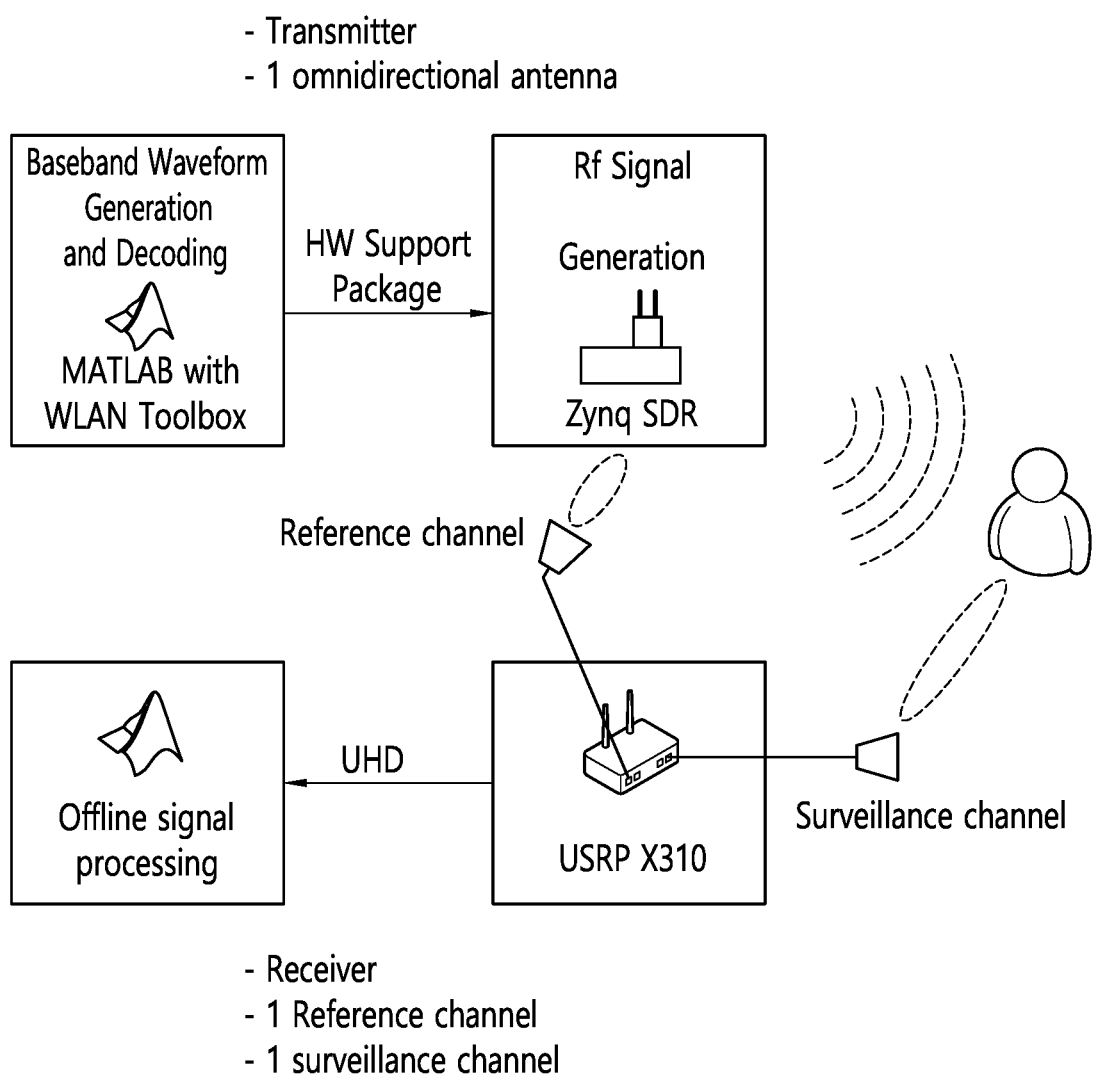
FIG. 6 is an example of an implementation of a wireless LAN sensing device.

FIG. 6 is an example of an implementation of a wireless LAN sensing device.

FIG. 6 is an implementation of a wireless LAN sensing device using MATLAB Toolbox, Zynq, and USRP. An IEEE 802.11ax wireless LAN signal is generated in the MATLAB toolbox, and an RF signal is generated using Zynq Software Defined Radio (SDR). The signal passing through the channel is received by USRP SDR and the sensing signal processing is performed in the MATLAB toolbox. Here, one reference channel (a channel that can be directly received from a sensing transmitter) and one surveillance channel (a channel that can be received by being reflected by an object) are assumed. As a result of analysis using a wireless LAN sensing device, a unique characteristic that can distinguish movement or body movement was obtained.

Currently, IEEE 802.11bf wireless LAN sensing standardization is in the initial development stage, and cooperative sensing technology to improve sensing accuracy will be treated as important in the future. It is expected that the synchronization technology of sensing signals for cooperative sensing, CSI management and use technology, sensing parameter negotiation and sharing technology, and scheduling technology for CSI generation will be the key topics for standardization. In addition, long-distance sensing technology, low-power sensing technology, sensing security and privacy protection technology will also be considered as major agenda items.

IEEE 802.11bf wireless LAN sensing is a kind of radar technology that uses a wireless LAN signal that is commonly present anytime, anywhere. The table below shows typical IEEE 802.11bf use cases, which can be used in a wide range of real-life situations, such as indoor sensing, motion recognition, health care, 3D vision, and in-vehicle sensing. Because it is mainly used indoors, the operating range is usually within 10 to 20 meters, and the distance accuracy does not exceed 2 meters at most.

TABLE 2

| Name | details | Max range (m) | Key Performance Indicator | Range Accuracy (m) | Max Velocity (m/s)/ Velocity Accuracy | angular Accuracy (deg) |
| --- | --- | --- | --- | --- | --- | --- |
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition-short range (finger movement) | Identification of a gesture from a set of gestures- range < 0.5 m | 0.5 | Gesture Detection | | 7 | 3 |
| Gesture recognition- medium range (hand movement) | Indentification of a gesture from a set of gestures- range > 0.5m | 2 | Gesture Detection | | | |
| Gesture recognition-large range (full body movement) | Indentification of a gesture from a set of gestures- range > 2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care-Fall detection | Fall detection- abnormal position detection | 10 | | 0.2 | 3/0.1 | |

TABLE 2-continued

| Name | details | Max range (m) | Key Performance Indicator | Range Accuracy (m) | Max Velocity (m/s)/ Velocity Accuracy | angular Accuracy (deg) |
|---|---|---|---|---|---|---|
| Health case-remote diagnostics | measurements of breathing rate, heart rate etc. | 5 | Breathing rate accuracy/ Pulse Accuracy | 0.5 | 2/0.1 | |
| Surveillance/Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |
| In car sensing-detection | detection of humans in car | 5 | Presence of Human in car | 0.1 | 1/0.1 | 3 |
| In car sensing | Driver sleepiness detection/ detection aid | 3 | Fast detection of driver sleepiness | 0.01 | 1/0.1 | 3 |

In IEEE 802.11, a technology for sensing the motion or gesture of an object (person or thing) using a wi-fi signal of 60 GHz (e.g., 802.11ad or 802.11ay signal) is being discussed. In this specification, a method for configuring a frame format used for wi-fi sensing and a wi-fi sensing sequence are proposed.

Figure 7:
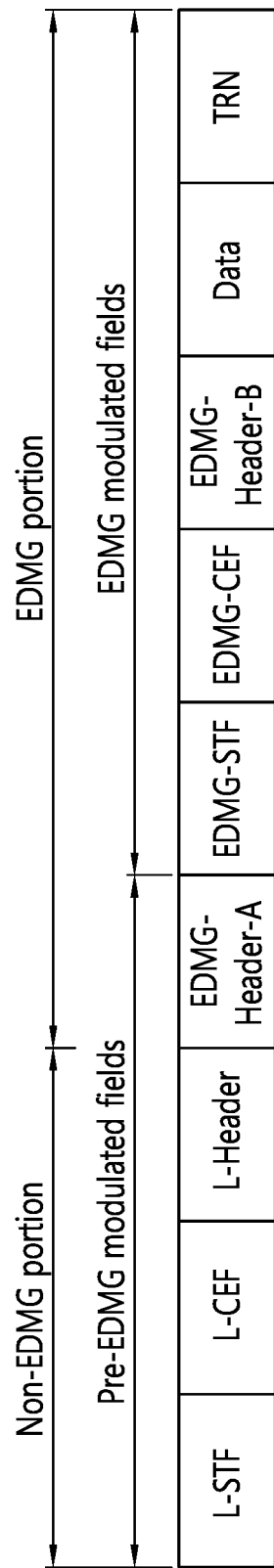
FIG. 7 is a diagram briefly illustrating a PPDU structure supported by an 802.11ay wireless LAN system.

FIG. 7 is a diagram briefly illustrating a PPDU structure supported by an 802.11ay wireless LAN system.

As shown in FIG. 7, the PPDU format applicable to the 802.11ay system may include L-STF, L-CEF, L-Header, EDMG-Header-A, EDMG-STF, EDMG-CEF, EDMG-Header-B, Data, and TRN fields. The fields may be selectively included according to the type of PPDU (e.g., SU PPDU, MU PPDU, etc.).

Here, a portion including the L-STF, L-CEF, and L-Header fields may be referred to as a non-EDMG portion, and the remaining portion may be referred to as an EDMG portion. In addition, the L-STF, L-CEF, L-Header, and EDMG-Header-A fields may be named pre-EDMG modulated fields, and the remaining parts may be named EDMG modulated fields.

The EDMG-Header-A field includes information required to demodulate an EDMG PPDU. The definition of the EDMG-Header-A field is the same as that of the EDMG SC mode PPDU and the EDMG OFDM mode PPDU, but is different from the definition of the EDMG control mode PPDU.

The structure of the EDMG-STF depends on the number of consecutive 2.16 GHz channels through which the EDMG PPDU is transmitted and the index $i_{STS}$ of the $i_{STS}$-th space-time stream. For single space-time stream EDMG PPDU transmission using EDMG SC mode through one 2.16 GHz channel, the EDMG-STF field does not exist. For EDMG SC transmission, the EDMG-STF field should be modulated using pi/(2-BPSK).

The structure of the EDMG-CEF depends on the number of consecutive 2.16 GHz channels through which the EDMG PPDU is transmitted and the number of space-time stream $i_{STS}$s. For single space-time stream EDMG PPDU transmission using EDMG SC mode through one 2.16 GHz channel, the EDMG-CEF field does not exist. For EDMG SC transmission, the EDMG-CEF field should be modulated using pi/(2-BPSK).

The (legacy) preamble part of the PPDU as described above can be used in packet detection, automatic gain control (AGC), frequency offset estimation, synchronization, modulation (SC or OFDM) indication and channel estimation. The format of the preamble may be common for OFDM packet and SC packet. In this case, the preamble may include a Short Training Field (STF) and a Channel Estimation (CE) field located after the STF field.

In 11SENS, a signal transmission/reception method of 802.11ad and 802.11ay, which is a 60 GHz Wi-Fi technology, is being considered in order to sense a motion or gesture of an STA or a person using a 60 GHz Wi-Fi signal. In this specification, for efficient Wi-Fi sensing, a method for configuring a sensing frame for channel estimation between an AP and an STA or an STA and an STA, and a sensing sequence for transmitting and receiving a sensing frame are proposed.

FIG. 8 shows an example of a sensing frame format.

The Wi-Fi sensing signal may be transmitted/received for channel estimation between the AP/STA and the STA using a wi-fi signal of 60 GHz. At this time, the sensing frame includes a non-EDMG preamble portion (i.e., L-STF, L-CEF, L-Header) in order to support backward capability with 802.11ad and 802.11ay, which are the existing 60 GHz Wi-Fi signals. Therefore, it can be configured in a frame format as shown in FIG. 8.

As shown in FIG. 8, the sensing frame may be configured of L-STF, L-CEF, L-Header, EDMG-Header A, EDMG-STF, and EDMG-CEF.

That is, since the sensing frame performs sensing on an STA or object by estimating a change in a channel between P2P (Point to point) or P2MP (point to multipoint), unlike the existing EDMG frame, it can be configured without including a data field.

Since the EDMG frame can be transmitted using one or more channels (ie, various channel bandwidths) of the 60 GHz band, the sensing frame is composed of EDMG-STF and EDMG-CEF fields as shown in FIG. 8.

Using the EDMG-STF and EDMG-CEF fields, the STA/AP can accurately measure channel information in sensing transmission/reception bandwidth (BW).

The information on the BW used for the sensing can be transmitted through the EDMG-header A, and at this time, it can be transmitted using the following various BWs.

TABLE 3

| Index | BW |
| --- | --- |
| 1 | 2.16 GHZ |
| 2 | 4.32 GHZ |
| 3 | 6.48 GHZ |
| 4 | 8.64 GHZ |
| 5 | 2.16 + 2.16 GHz (non-contiguous) |
| 6 | 4.32 + 4.32 GHz (non-contiguous) |

Figure 9:
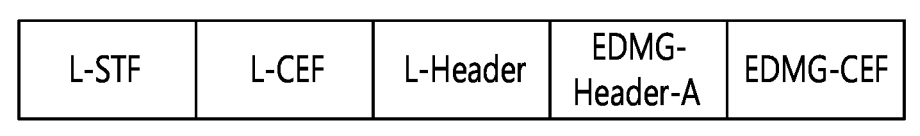

FIG. 9 shows another example of a sensing frame format.

Unlike the above, the sensing signal may be transmitted using only a fixed BW (eg, 2.16 GHz), and in this case, an additional AGC or the like is not required, so that the EDMG-STF can be omitted. Therefore, when sensing is performed using only a predetermined BW, the sensing frame format can be configured as shown in FIG. 9 by omitting the EDMG-STF. In addition, since only a set BW is used, the EDMG-header may not include the BW field unlike the existing ones during sensing.

FIG. 10 shows another example of a sensing frame format.

802.11ay transmission at 60 GHz basically transmits a signal using beamforming, and at this time, in order to set the optimal beam between Tx and Rx, AWV (antenna weight) for Tx antenna and Rx antenna using training (i.e., TRN) field vector) is set. Therefore, since the sensing frame transmits a signal using the previously determined AWV, it is difficult to accurately reflect the changed channel condition. Therefore, in order to more accurately measure the change in the channel, the sensing frame may include the TRN field as follows, and in this case, the information on the channel may be measured through the TRN field.

In FIG. 10, the sensing frame does not include a data field, and since channel measurement for sensing is performed using TRN, the EDMG-CEF field for channel estimation can be omitted. Therefore, the sensing frame format can be configured as shown in FIG. 11.

FIG. 11 shows another example of a sensing frame format.

Figure 12:
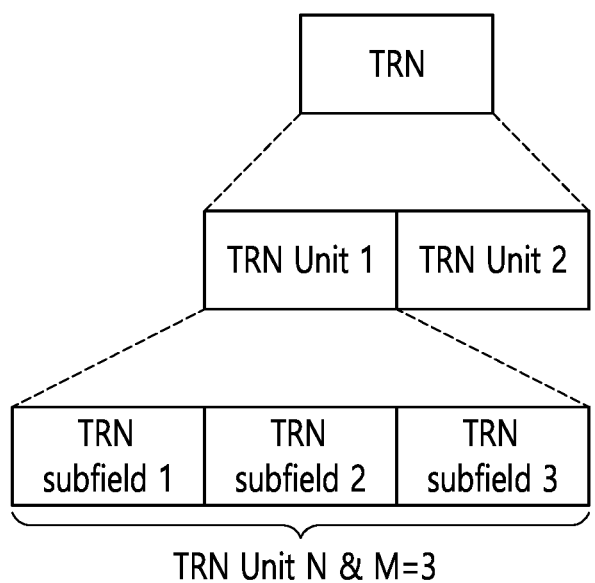
FIG. 12 shows an example of the configuration of the TRN field.

FIG. 12 shows an example of the configuration of the TRN field.

In the above, the TRN field for channel estimation does not support Beam Refinement Protocol (BRP)-Rx (only BRP-Tx is supported). In this case, the TRN subfield unit constituting the EDGM TRN unit may be configured as shown in FIG. 12.

In the above, the TRN field for channel estimation does not support Beam Refinement Protocol (BRP)-Rx (only BRP-Tx is supported). In this case, the TRN subfield unit constituting the EDGM TRN unit may be configured as shown in FIG. 12. Except when the DMG antenna used for PPDU transmission is changed at the beginning of the TRN field, the EDMG TRN-unit P indicates the number of TRN subfields requested at the start of the TRN-Unit using the same AWV as the AWV used for transmission of the preamble and data fields of the PPDU. If the value of EDMG TRN-unit P is 0, it indicates that there are 0 requested TRN subfields, and if the value of EDMG TRN-unit P is 1, it indicates that there is 1 requested TRN subfield, if the value of EDMG TRN-unit P is 2, it indicates two requested TRN subfields, and if the value of EDMG TRN-unit P is 3, it indicates that there are four requested TRN subfields.

A value obtained by adding 1 to the EDMG TRN-Unit M field indicates the number of TRN subfields requested in the TRN-Unit that can be used for transmission training. This field plus 1 is an integer multiple of the value displayed in the EDMG TRN-Unit N field.

The EDMG TRN-Unit N field indicates the number of consecutive TRN subfields requested in the EDMG TRN-Unit M transmitted using the same AWV. If the value of EDMG TRN-Unit N is 0, it represents one requested TRN subfield, if the value of EDMG TRN-Unit N is 1, it represents two requested TRN subfields, and if the value of EDMG TRN-Unit N is 2, when the EDMG TRN-Unit M field is 2, 5, 8, 11 or 14, it indicates three requested TRN subfields. If the value of EDMG TRN-Unit N is 2, if the EDMG TRN-Unit M field is 7 or 15, 8 requested TRN subfields are indicated, and if the value of EDMG TRN-Unit N is 3, it indicates 4 requested TRN subfields.

EDMG TRN-unit P is set to zero. Since there is no data field in the sensing frame, the EDMG TRN-unit P defining the section using the same AWV as the data field is set to 0.

EDGM TRN Unit N and EDMG TRN-unit M may be set to 2 or 3 respectively and transmitted.

The TRN unit constituting the TRN field may consist of 2 or a value of 2 or more.

Here, the above is only an example, and the TRN field may be configured through a different number of TRN units and TRN subfields.

When sensing is performed in the 60 GHz band using the sensing frame configured as described above, since the sensing frame supports backward compatibility of 802.11ad and 802.11ay, packet classification for the sensing frame (or sensing PPDU) is required. That is, the STA performs packet classification for classifying whether the received frame is a sensing frame or a normal frame, thereby preventing unnecessary attempts by the STA to decode data for a sensing frame without data.

In this case, packet classification for a sensing frame (or sensing PPDU) may be performed using the following method.

1. A method of indicating using the reserved bit of the L-Header.

A. The sensing frame can be transmitted using EDMG SC or OFDM mode. At this time, Bit 46 of the L-Header field may be set to 1 in order to set the sensing frame as EDMG format.

B. In order to indicate that the frame is a sensing frame, it can be indicated by using the reserved bit 46 or 47 of the L-Header.

i. By setting either bit 46 or bit 47 to 1, it is possible to indicate that the frame (or PPDU) including the corresponding information is the sensing frame (or sensing PPDU).

C. The STA can confirm that the received frame (or PPDU) is a sensing frame (or sensing PPDU) using the value of reserved bits (Bit 46 or Bit 47) of the received L-Header.

D. In the above, both bit 46 and bit 47 may be used to indicate by setting a table with a 2-bit indicator.

i. When all 2 bits are used, up to 4 can be indicated, and signaling overhead can be reduced because it is not necessary to define additional signaling for packet classification for a frame (or PPDU) added later.

E. Since the reserved bit of the L-Header is used, there is no need to add new signaling for packet classification, so that packet classification can be performed without increasing signaling overhead.

2. Method of indicating using reserved bit of EDMG-Header A

A. Sensing frame can be configured of EDMG-SC frame/EDMG-OFDM frame. Therefore, the sensing frame can be classified using the reserved bit of the EDMG Header A included in the EDMG frame (or EDMG PPDU) for supporting the mode.

i. In the case of using the SU PPDU in the mode frame, classification for the frame (or PPDU) may be performed using one or two or more bits among reserved bits (10 bits, index 102 to 111).

1) For example, when using 1 bit, index 102 can be used, and by setting the bit to 1, it is possible to indicate that the frame is a sensing frame.

ii. In the case of MU-PPDU, a sensing frame can be indicated by using a reserved bit (1 bit, index 111).

1) By setting 1 bit corresponding to Index 111 to 1, it can indicate sensing frame.

iii. In order to indicate the sensing frame regardless of the SU and MU, the sensing frame can be indicated by using the reserved bit index 111 of the two PPDU EDMG Header A.

3. Method for indicating using Packet classification identifier

A. The sensing initiator configures EDMG-Header A by including an identifier for Packet classification in EDMG-header A.

i. The packet classification bit is configured of 2 bits or 3 bits and may include not only the sensing frame (or sensing PPDU) but also packet classification information for the next-generation frame discussed later at 60 GHz.

B. Unlike the above, the identifier for the packet classification may be included in the L-Header and transmitted.

Hereinafter, the above-described embodiment will be described with reference to FIGS. 1 to 12.

Figure 13:
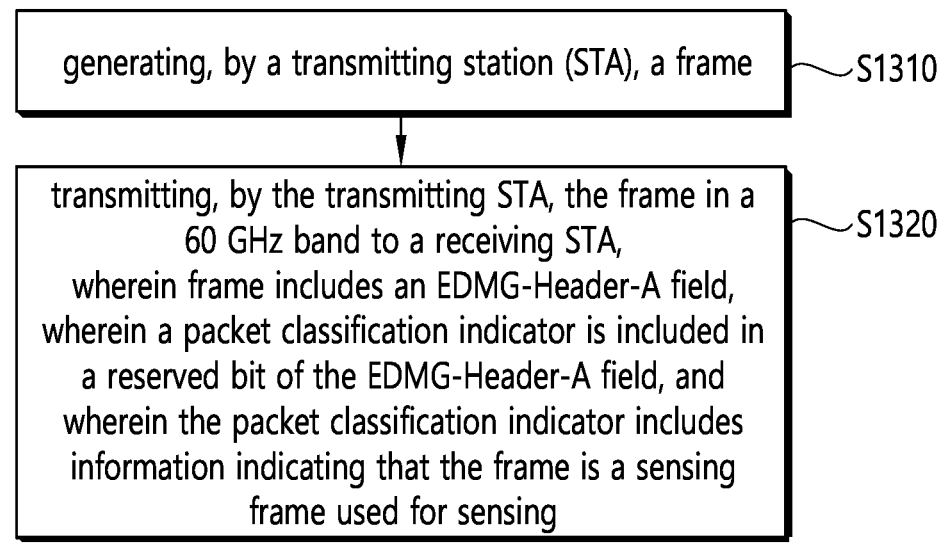
FIG. 13 is a flowchart illustrating a procedure in which a transmitting STA performs sensing according to the present embodiment.

FIG. 13 is a flowchart illustrating a procedure in which a transmitting STA performs sensing according to the present embodiment.

The example of FIG. 13 may be performed in a network environment in which a next-generation wireless LAN system (IEEE 802.11bf) is supported. The next-generation wireless LAN system is a wireless LAN system improved from 802.11ad and 802.11ay systems, and may satisfy backward compatibility with 802.11ad and 802.11ay systems.

The example of FIG. 13 is performed by a transmitting STA, and the transmitting STA may correspond to a sensing initiator. The receiving STA of FIG. 13 may correspond to a sensing responder.

This embodiment proposes a method of setting a packet classification indicator for distinguishing a sensing frame used to sense a motion or gesture of an STA or an object using a wireless signal of a 60 GHz band from a normal frame.

In step S1310, a transmitting station (STA) generates a frame.

In step S1320, the transmitting STA transmits the frame to the receiving STA in a 60 GHz band.

The frame includes an EDMG-Header-A field. A packet classification indicator is included in a reserved bit of the EDMG-Header-A field. The packet classification indicator includes information indicating that the frame is a sensing frame used for sensing. That is, the receiving STA may confirm that the frame is the sensing frame based on the packet classification indicator. As a result, the receiving STA does not need to attempt to detect data for the frame, so that the decoding process can be efficiently performed.

After the receiving STA identifies the frame as the sensing frame, the receiving STA performs channel measurement based on the received sensing frame and acquires sensing information. The receiving STA may know a change in amplitude and phase of a channel by performing channel measurement based on the sensing frame, and may acquire the sensing information through this.

When the frame is a Single User (SU) Physical Layer Protocol Data Unit (PPDU), the reserved bits of the EDMG-Header-A field are 10 bits (bit indexes 102 to 111). The packet classification indicator may indicate that the frame is the sensing frame using 1 bit or 2 bits among the 10 bits.

When the frame is a Multi User (MU) PPDU, the reserved bit of the EDMG-Header-A field is 1 bit having a bit index of 111. The packet classification indicator may indicate that the frame is the sensing frame using the 1 bit.

Alternatively, the reserved bit of the EDMG-Header-A field is 1 bit having a bit index of 111 regardless of whether the frame is a SU PPDU or an MU PPDU. The packet classification indicator may indicate that the frame is the sensing frame using the 1 bit.

In addition, the packet classification indicator may consist of 2 bits or 3 bits to indicate a type of the sensing frame. The type of the sensing frame may be defined as a type of various sensing frames defined in the next-generation WLAN system.

As described above, if the frame is a sensing frame used for sensing, the sensing frame may be configured as follows.

The sensing frame may include a non-Enhanced Directional Multi Gigabit (non-EDMG) part and an EDMG part. The non-EDMG part may include a Legacy-Short Training Field (L-STF), a Legacy-Channel Estimation Field (L-CEF) and an L-Header. The EDMG part includes the EDMG-Header-A field and does not include a data field. That is, since the sensing frame is a frame used for sensing an STA or an object, unlike the existing EDMG frame, it may be configured without including a data field.

The EDMG part may include an EDMG-STF, an EDMG-CEF or a training (TRN) field. The EDMG-STF, the EDMG-CEF and the TRN field are used for channel measurement. When the sensing frame is transmitted/received using only a fixed band, the EDMG-STF may be omitted because additional Automatic Gain Control (AGC) is not required. In addition, the TRN field may be included in the frame to more accurately measure the channel change. In addition, if the TRN field is included in the sensing frame, the EDMG-CEF used for channel estimation may be omitted.

The EDMG-Header-A field may include information on a bandwidth in which the sensing frame is transmitted, information on EDMG TRN unit P, information on EDMG TRN unit N, and information on EDMG TRN unit M.

The bandwidth through which the sensing frame is transmitted may be set to one of 2.16 GHz, 4.32 GHz, 6.48 GHz, 8.64 GHz, 2.16+2.16 GHz, or 4.32+4.32 GHz.

The EDMG TRN unit P may be set to 0. This is because the data field is not included in the sensing frame. The EDMG TRN unit N may be set to 2 or 3, and the EDMG TRN unit M may be set to 2 or 3. The TRN field may consist of two or more TRN units. That is, the configuration of the TRN field may be determined through the information.

Also, the packet classification indicator may be included in the reserved bit of the L-Header. The reserved bit of the L-Header may be included in a first bit having a bit index of 46 or a second bit having a bit index of 47. The packet classification indicator may indicate that the frame is the sensing frame using a first bit or a second bit. Since the embodiment performs packet classification using the reserved bit of the L-Header, there is an effect that packet classification can be performed without an increase in signaling overhead because new signaling is not added.

The sensing frame may be set to an EDMG Single Carrier (SC) frame or EDMG Orthogonal Frequency Division Multiplexing (OFDM) frame. In order to inform that the sensing frame is the EDMG format, a first bit having a bit index of 46 among reserved bits of the L-Header may be set to 1.

Figure 14:
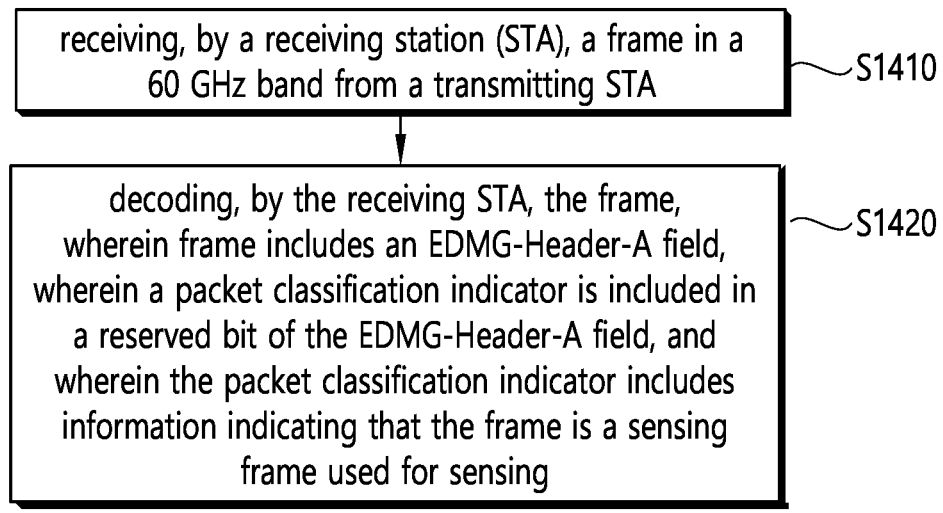
FIG. 14 is a flowchart illustrating a procedure in which a receiving STA performs sensing according to the present embodiment.

FIG. 14 is a flowchart illustrating a procedure in which a receiving STA performs sensing according to the present embodiment.

The example of FIG. 14 may be performed in a network environment in which a next-generation wireless LAN system (IEEE 802.11bf) is supported. The next-generation wireless LAN system is a wireless LAN system improved from 802.11ad and 802.11ay systems, and may satisfy backward compatibility with 802.11ad and 802.11ay systems.

The example of FIG. 14 is performed by a receiving STA, and the receiving STA may correspond to a sensing responder. The transmitting STA of FIG. 14 may correspond to a sensing initiator.

This embodiment proposes a method of setting a packet classification indicator for distinguishing a sensing frame used to sense a motion or gesture of an STA or an object using a wireless signal of a 60 GHz band from a normal frame.

In step S1410, a receiving STA (station) receives frame in a 60 GHz band from a transmitting STA.

In step S1420, the receiving STA decodes the frame.

The frame includes an EDMG-Header-A field. A packet classification indicator is included in a reserved bit of the EDMG-Header-A field. The packet classification indicator includes information indicating that the frame is a sensing frame used for sensing. That is, the receiving STA may confirm that the frame is the sensing frame based on the packet classification indicator. As a result, the receiving STA does not need to attempt to detect data for the frame, so that the decoding process can be efficiently performed.

After the receiving STA identifies the frame as the sensing frame, the receiving STA performs channel measurement based on the received sensing frame and acquires sensing information. The receiving STA may know a change in amplitude and phase of a channel by performing channel measurement based on the sensing frame, and may acquire the sensing information through this.

When the frame is a Single User (SU) Physical Layer Protocol Data Unit (PPDU), the reserved bits of the EDMG-Header-A field are 10 bits (bit indexes 102 to 111). The packet classification indicator may indicate that the frame is the sensing frame using 1 bit or 2 bits among the 10 bits.

When the frame is a Multi User (MU) PPDU, the reserved bit of the EDMG-Header-A field is 1 bit having a bit index of 111. The packet classification indicator may indicate that the frame is the sensing frame using the 1 bit.

Alternatively, the reserved bit of the EDMG-Header-A field is 1 bit having a bit index of 111 regardless of whether the frame is a SU PPDU or an MU PPDU. The packet classification indicator may indicate that the frame is the sensing frame using the 1 bit.

In addition, the packet classification indicator may consist of 2 bits or 3 bits to indicate a type of the sensing frame. The type of the sensing frame may be defined as a type of various sensing frames defined in the next-generation WLAN system.

As described above, if the frame is a sensing frame used for sensing, the sensing frame may be configured as follows.

The sensing frame may include a non-Enhanced Directional Multi Gigabit (non-EDMG) part and an EDMG part. The non-EDMG part may include a Legacy-Short Training Field (L-STF), a Legacy-Channel Estimation Field (L-CEF) and an L-Header. The EDMG part includes the EDMG-Header-A field and does not include a data field. That is, since the sensing frame is a frame used for sensing an STA or an object, unlike the existing EDMG frame, it may be configured without including a data field.

The EDMG part may include an EDMG-STF, an EDMG-CEF or a training (TRN) field. The EDMG-STF, the EDMG-CEF and the TRN field are used for channel measurement. When the sensing frame is transmitted/received using only a fixed band, the EDMG-STF may be omitted because additional Automatic Gain Control (AGC) is not required. In addition, the TRN field may be included in the frame to more accurately measure the channel change. In addition, if the TRN field is included in the sensing frame, the EDMG-CEF used for channel estimation may be omitted.

The EDMG-Header-A field may include information on a bandwidth in which the sensing frame is transmitted, information on EDMG TRN unit P, information on EDMG TRN unit N, and information on EDMG TRN unit M.

The bandwidth through which the sensing frame is transmitted may be set to one of 2.16 GHz, 4.32 GHz, 6.48 GHz, 8.64 GHz, 2.16+2.16 GHz, or 4.32+4.32 GHz.

The EDMG TRN unit P may be set to 0. This is because the data field is not included in the sensing frame. The EDMG TRN unit N may be set to 2 or 3, and the EDMG TRN unit M may be set to 2 or 3. The TRN field may consist of two or more TRN units. That is, the configuration of the TRN field may be determined through the information.

Also, the packet classification indicator may be included in the reserved bit of the L-Header. The reserved bit of the L-Header may be included in a first bit having a bit index of 46 or a second bit having a bit index of 47. The packet classification indicator may indicate that the frame is the sensing frame using a first bit or a second bit. Since the embodiment performs packet classification using the reserved bit of the L-Header, there is an effect that packet classification can be performed without an increase in signaling overhead because new signaling is not added.

The sensing frame may be set to an EDMG Single Carrier (SC) frame or EDMG Orthogonal Frequency Division Multiplexing (OFDM) frame. In order to inform that the sensing frame is the EDMG format, a first bit having a bit index of 46 among reserved bits of the L-Header may be set to 1.

The technical features of the present disclosure may be applied to various devices and methods. For example, the technical features of the present disclosure may be performed/supported through the device(s) of FIG. 1 and/or FIG. 6. For example, the technical features of the present disclosure may be applied to only part of FIG. 1 and/or FIG.

6. For example, the device according to the present disclosure generate a frame; and transmit the frame in a 60 GHz band to a receiving station (STA).

The technical features of the present disclosure may be implemented based on a computer readable medium (CRM). For example, a CRM according to the present disclosure is at least one computer readable medium including instructions designed to be executed by at least one processor.

The CRM may store instructions that perform operations including generating a frame; and transmitting the frame in a 60 GHz band to a receiving station (STA). The instructions stored in the CRM of the present specification may be executed by at least one processor. The CRM in the present specification may be a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
generating, by a station (STA), an enhanced directional multi-gigabit (EDMG) multistatic sensing physical protocol data unit (PPDU); and
transmitting, by the STA, the EDMG multistatic sensing PPDU,
wherein the EDMG multistatic sensing PPDU includes an EDMG-Header-A field, and
wherein the EDMG multistatic sensing PPDU is indicated by setting a Multistatic Sensing field within the EDMG-Header-A field to 1.

2. The method of claim 1,
wherein the Multistatic Sensing field includes information indicating that the EDMG multistatic sensing PPDU is a sensing frame used for sensing,
wherein when the EDMG multistatic sensing PPDU is a single user (SU) physical layer protocol data unit (PPDU),
the Multistatic Sensing field is 10 bits,
the Multistatic Sensing field indicates that the EDMG multistatic sensing PPDU is the sensing frame by using 1 bit or 2 bits among the 10 bits.

3. The method of claim 2, wherein when the EDMG multistatic sensing PPDU is a multi user (MU) PPDU,
the Multistatic Sensing field is 1 bit having a bit index of 111,
the Multistatic Sensing field indicates that the EDMG multistatic sensing PPDU is the sensing frame using the 1 bit.

4. The method of claim 2,
wherein the Multistatic Sensing field is 1 bit having a bit index of 111 regardless of whether the frame-EDMG multistatic sensing PPDU is a SU PPDU or a MU PPDU,
wherein the Multistatic Sensing field indicates that the EDMG multistatic sensing PPDU is the sensing frame using the 1 bit.

5. The method of claim 2, wherein the Multistatic Sensing field consists of 2 bits or 3 bits to indicate a type of the sensing frame.

6. The method of claim 1,
wherein the EDMG multistatic sensing PPDU includes a non-Enhanced Directional Multi Gigabit (non-EDMG) part and an EDMG part,
wherein the non-EDMG part includes a Legacy-Short Training Field (L-STF), a Legacy-Channel Estimation Field (L-CEF) and an L-Header,
wherein the EDMG part includes the EDMG-Header-A field and does not include a data field,
wherein the EDMG part includes an EDMG-STF, an EDMG-CEF or a training (TRN) field,
wherein the EDMG-STF, the EDMG-CEF and the TRN field are used for channel measurement.

7. The method of claim 1, wherein the EDMG multistatic sensing PPDU is set to an EDMG Single Carrier (SC) frame or EDMG Orthogonal Frequency Division Multiplexing (OFDM) frame.

8. A station (STA) in a wireless local area network (WLAN) system, the STA comprising:
a memory;
a transceiver; and
a processor being operatively connected to the memory and the transceiver,
wherein the processor is configured to:
generate an enhanced directional multi-gigabit (EDMG) multistatic sensing physical protocol data unit (PPDU); and
transmit the EDMG multistatic sensing PPDU,
wherein the EDMG multistatic sensing PPDU includes an EDMG-Header-A field, and
wherein the EDMG multistatic sensing PPDU is indicated by setting a Multistatic Sensing field within the EDMG-Header-A field to 1.

9. A method in a wireless local area network (WLAN) system, the method comprising:
receiving, by a station (STA), an enhanced directional multi-gigabit (EDMG) multistatic sensing physical protocol data unit (PPDU); and
decoding, by the STA, the EDMG multistatic sensing PPDU,
wherein the EDMG multistatic sensing PPDU includes an EDMG-Header-A field, and
wherein the EDMG multistatic sensing PPDU is indicated by setting a Multistatic Sensing field within the EDMG-Header-A field to 1.

10. The method of claim 9,
wherein the Multistatic Sensing field includes information indicating that the EDMG multistatic sensing PPDU is a sensing frame used for sensing,
wherein when the EDMG multistatic sensing PPDU is a single user (SU) physical layer protocol data unit (PPDU),
the Multistatic Sensing field is 10 bits,
the Multistatic Sensing field indicates that the frame EDMG multistatic sensing PPDU is the sensing frame by using 1 bit or 2 bits among the 10 bits.

11. The method of claim 1, wherein when the EDMG multistatic sensing PPDU is a multi-user (MU) PPDU,
the Multistatic Sensing field is 1 bit having a bit index of 111,
the Multistatic Sensing field indicates that the EDMG multistatic sensing PPDU is the sensing frame using the 1 bit.

12. The method of claim 1,
wherein the Multistatic Sensing field is 1 bit having a bit index of 111 regardless of whether the EDMG multistatic sensing PPDU is a SU PPDU or a MU PPDU,
wherein the Multistatic Sensing field indicates that the EDMG multistatic sensing PPDU is the sensing frame using the 1 bit.

13. The method of claim 1, wherein the Multistatic Sensing field consists of 2 bits or 3 bits to indicate a type of the sensing frame.

14. The method of claim 9,
wherein the EDMG multistatic sensing PPDU includes a non-Enhanced Directional Multi Gigabit (non-EDMG) part and an EDMG part,
wherein the non-EDMG part includes a Legacy-Short Training Field (L-STF), a Legacy-Channel Estimation Field (L-CEF) and an L-Header,
wherein the EDMG part includes the EDMG-Header-A field and does not include a data field,
wherein the EDMG part includes an EDMG-STF, an EDMG-CEF or a training (TRN) field,
wherein the EDMG-STF, the EDMG-CEF and the TRN field are used for channel measurement.

\* \* \* \* \*